United States Patent Office 3,702,286
Patented Nov. 7, 1972

3,702,286
METHOD OF PLATING FOR VINYL CHLORIDE RESINS
Minoru Ichiki and Yutaka Ushimaru, Tokyo, Japan, assignors to Mitsui Mining & Smelting Co., Ltd., Tokyo, Japan
No Drawing. Filed Sept. 8, 1970, Ser. No. 70,525
Claims priority, application Japan, Sept. 5, 1969, 44/70,341
Int. Cl. C23b 5/62
U.S. Cl. 204—30      4 Claims

ABSTRACT OF THE DISCLOSURE

A method of plating a vinyl chloride resin comprising the steps of: pre-etching a vinyl chloride resin by means of a solution or an emulsion containing monohydric phenol; etching said resin by means of a highly concentrated mixture of sulfuric acid and chromic acid; subsequently effecting chemical plating of the thus etched resin; and thereafter effecting electro-plating of the chemically plated resin.

BACKGROUND OF THE INVENTION (a) Field of the invention

The present invention relates to a method of plating a vinyl chloride resin and more particularly, relates to a method of pre-etching by employing a phenol-containing solution or emulsion for use in plating a vinyl chloride resin.

(b) Description of the prior art

As plastics capable of being plated in the prior art, acrylonitrile-butadiene-styrene resin (viz, ABS resin) is popular, while the instances of practicing the plating of other synthetic resins on an industrial basis are very few and far between. Said ABS resin can be readily provided with a microscopic roughening, which provides a hydrophilic property suitable for chemical plating, on the surface of the resin only by means of treating it with a solution of chromic acid mixture. On the contrary, in the case of resins other than ABS resin, such as, for instance, resins affiliated to vinyl chloride, the provision of a microscopic roughening suitable for plating is infeasible unless a mechanical process is employed inasmuch as there has so far been no suitable etching solution available for making the surface of such a resin rough enough for said plating purpose.

SUMMARY OF THE INVENTION

Since vinyl chloride resins are inexpensive and readily available resins for general uses, the plating of this kind of resin is a very attractive thing from an industrial point of view.

From this point of view, the inventors have made a series of studies on how to plate resins of the vinyl chloride family, and have discovered that, by effecting pre-etching of a vinyl chloride resin by means of a phenol-containing solutions or emulsion, followed by etching with a solution of chromic acid mixture, the surface of said resin can be provided with a roughening suitable for plating.

The term "resin affiliated to vinyl chloride" in the present invention means polyvinyl chloride, vinyl chloride copolymers, as well as polymer blends containing polyvinyl chloride or vinyl chloride copolymer.

The etching in the present invention is effected by dipping a resin affiliated to vinyl chloride in a phenol-containing solution or emulsion and heating same. Said phenol-containing solution or emulsion refers to an emulsion or solution comprising a monohydric phenol such as phenol, cresol, xylenol, ethyl phenol, etc., and water or an organic solvent. As the organic solvent applicable in the present invention, there can be used such organic solvents as alcohols, ketones such as acetone, methyl isobutyl-ketone, etc., tetrahydrofuran, and so forth. The amount of monohydric phenol contained in said phenol-containing solution or emulsion, should be at least 2 percent by weight, in the case of an aqueous emulsion, but, in the case of an organic solvent solution, it suffices to contain some phenol irrespective of the amount thereof.

The phenol-containing solution or emulsion applicable in the present invention may be further mixed with chlorinated hydrocarbons such as ethylene chloride, perchloroethylene, trichloroethylene, etc., and aromatic hydrocarbon such as diethylbenzene, and it may also be combined with such surface active agent as polyoxyethylene alkylphenol ether, alkylallyl polyether sodium sulfonate, etc. Adding of these additives is accompanied by such advantages that their inflammability as well as their toxicity are reduced.

The treatment of a resin with a phenol-containing solution or emulsion is intended to dissolve the surface of the resin just slightly. In this context, in case the temperature of the treating solution is in the proximity of room temperature, there scarcely occurs any dissolving of the resin, resulting in little effect, while, as the temperature of the treating solution gets higher, the dissolving of the resin is increased accordingly. Besides, in case where the time of treatment is too long, there occurs dissolving of the material resin in toto. The essential thing in this treatment with the solution is to see that only the surface portion of the resin is dissolved while the underlying portion remains undissolved. It is, therefore, advisable that combination of the temperature of the treating solution and the time of treatment be appropriately arranged according to the material resin. The treating conditions of the pre-etching of the present invention include a temperature ranging from room temperature to 70° C., and a period of time ranging from 0.1 to 15 minutes. For instance, in case of an injection-molding product consisting of a vinyl chloride resin of a relatively low degree of polymerization, it suffices to subject it to the treatment with said solution at a temperature in the range of 40°–50° C. for 5–10 minutes, and in case of an extrusion-molding product or calendering-processed product consisting of a vinyl chloride resin of a relatively high degree of polymerization, it suffices to subject it to the treatment with said solution at a temperature in the range of 60°–70° C. for 10–15 minutes. By virtue of such treatment, the surface of the material resin gets microscopically roughened and swollen, whereby the effect of the treatment with a highly concentrated mixture of sulfuric acid and chromic acid subsequent thereto is enhanced.

According to the present invention, for the purpose of providing the resin treated with said phenol-containing solution or emulsion with a hydrophilic property, said resin is then subjected to conventional etching treatment. This treatment is performed by dipping said resin in a highly concentrated mixture of sulfuric acid and chromic acid consisting substantially of bichromate or chromic anhydride and an inorganic acid such as sulfuric acid. On this occasion, too, it is necessary to regulate to some extent— though such strict control as in the case of the treatment with phenol-containing solution or emulsion is not required—the concentration of chromic acid, the concentration of acids and the time of treatment according to the kind of resin employed, so as to avoid over-etching, like in the case of the foregoing treatment with the phenol-containing solution or emulsion, and thus the effect of rendering the surface of the material resin roughening is further enhanced.

The treatment with a phenol-containing solution or emulsion displays a remarkable pre-etching effect by serving as the preliminary treatment prior to the treatment with a highly concentrated mixture of sulfuric acid and chromic acid as set forth above, and this is verified by the fact, for instance, that, in case the chemical plating is applied to a vinyl chloride resin by treating it with a highly concentrated mixture of sulfuric acid and chromic acid without employing the pretreatment with a phenol-containing solution or emulsion, the adherence of the plating metal onto the material resin is so poor that there occurs bulging and the product thus plated can hardly be put to practical use.

The efficiency of the method of the present invention in providing the intended roughened surface for a material resin has been proved through microscopic examination which shows that, the surface roughening effected by treatment with a highly concentrated mixture of sulfuric acid and chromic acid alone is not so conspicuous, while the resin subjected to the treatment with the phenol-containing solution or emulsion and with a highly concentrated mixture of sulfuric acid and chromic acid subsequent thereto, according to the present invention, is provided with a microscopically roughened surface which is quite ideal for plating.

Once the resin is subjected to the preliminary treatment prior to plating operation according to the method of the present invention, it is only necessary thereafter to apply conventional chemical plating processes such as sensitizing by employing stannous chloride solution, activation by employing palladium chloride solution, electroless copper-plating or electroless nickel-plating and subsequently applying electro-plating thereto, but there is no need to employ any specific chemical plating process therefor, so that the current plating operation for ABS resin can be applied as it is. Besides, inasmuch as the preliminary treatment prior to plating according to the method of the present invention requires no mechanical process for surface-roughening, there is no fear of causing chapping of the texture of the plated surface of the resin incident to the mechanical roughening, and, accordingly, there can be obtained a product which is pleasing in appearance.

Given in the following are examples embodying the method of the present invention.

EXAMPLE 1

| | Parts by volume |
|---|---|
| Cresylic acid | 100 |
| Perchloroethylene | 100 |
| Methyl isobutyl ketone | 20 |
| Polyoxyethylene alkylphenol ether | 0.5 |

In a solution composed of the foregoing compounds was dipped a 3 mm.-thick plate of hard vinyl chloride resin for 10 minutes at a temperature of 70° C., thereby effecting preliminary treatment. Subsequently, the thus treated resin plate was subjected to a dipping treatment with a highly concentrated mixture of sulfuric acid and chromic acid consisting of 30 g./l. of chromic acid and 600 cc./l. of sulfuric acid for 15 minutes at a temperature of 70° C., whereby pre-treatment for plating was effected. When the resin plate processed as above was subjected to conventional electro-plating (with copper, nickel and chromium) subsequent to sensitizing by employing stannous chloride solution, activation by employing palladium chloride solution, and chemical copper-plating, there was obtained an ideal plated product free from such defects as poor adherence, skipping, chapping of texture, etc.

EXAMPLE 2

The resin plate subjected to pre-treatment for plating as described in Example 1 was subjected to conventional chemical copper-plating and subsequently electric copper-plating. When the firmness of adherence of the thus provided plating was measured through peeling test by applying a pull in right-angle direction, it showed 3,500 g./cm. of peeling strength.

EXAMPLE 3

An injection-molding product consisting of vinyl chloride was dipped in O-cresol for 5 minutes at a temperature of 40° C., thereby effecting preliminary treatment. Subsequently, the thus treated product was subjected to dipping treatment with a highly concentrated mixture of sulfuric acid and chromic acid consisting of 30 g./l. of potassium bichromate and 500 cc./l. of sulfuric acid for 10 minutes at a temperature of 40° C., whereby pre-treatment for plating was effected. When said product processed as above was subjected to conventional electro-plating subsequent to sensitizing by employing stannous chloride solution, activation by employing palladium chloride solution, and chemical copper-plating, there was obtained a pretty plated product free from such defects as poor adherence, skipping, chapping of texture, etc. Besides, when the firmness of adherence of the plating was tested at the stage of completion of the chemical copper-plating process by means of cross cut and stripping by Scotch (trademark) tape, there were observed no exfoliation of the plating, while, in the case of a comparative product prepared by employing the same material and applying chemical copper-plating upon pre-treatment with only a highly concentrated mixture of sulfuric acid and chromic acid, there occurred bulging, and the whole plated-layer came off when pulled by means of stripping by Scotch (trademark) tape stuck thereon.

What we claim is:

1. In a process for electroplating objects made of a resin selected from the group consisting of polyvinyl chloride and copolymers and polymer blends thereof, by the steps of treating the surface of the object to roughen and etch the surface thereof, followed by chemical plating of the object and then electroplating the object, the improvement in which the treating comprises the steps of contacting the surface of the object with a treating agent selected from the group consisting of liquid monohydric phenol and emulsions and solutions of monohydric phenol in water or an inert organic solvent, at a temperature in the range of from room temperature to 70° C., for a time period in the range of from 0.1 to 15 minutes, and then contacting said surface with a mixture of chromic acid and sulfuric acid to etch said surface.

2. A method according to claim 1, wherein the treating agent agent is an aqueous emulsion containing at least 2 percent by weight of monohydric phenol.

3. A method according to claim 1, wherein the treating agent is an organic solvent solution containing monohydric phenol.

4. A method according to claim 1, wherein said monohydric phenol is a member selected from the group consisting of phenol, cresol, xylenol and ethyl phenol.

References Cited

UNITED STATES PATENTS

| 3,574,070 | 4/1971 | Sahely | 117—47 A |
| 3,533,828 | 10/1970 | Rowe | 204—30 |

FOREIGN PATENTS

| 1,227,755 | 10/1966 | Germany | 204—20 |

JOHN H. MACK, Primary Examiner

W. I. SOLOMON, Assistant Examiner

U.S. Cl. X.R.

117—47 A